United States Patent [19]

Ohmori et al.

[11] 4,210,928
[45] Jul. 1, 1980

[54] PROJECTING APPARATUS

[75] Inventors: Masayuki Ohmori; Norio Ito, both of Tokyo, Japan

[73] Assignee: Sony Corporation, Tokyo, Japan

[21] Appl. No.: 973,581

[22] Filed: Dec. 27, 1978

Related U.S. Application Data

[63] Continuation-in-part of Ser. No. 903,002, May 4, 1978, abandoned.

[30] Foreign Application Priority Data

May 9, 1977 [JP] Japan .................................. 52-52883

[51] Int. Cl.² ............................................. H04N 9/31
[52] U.S. Cl. ..................................................... 358/60
[58] Field of Search ........................ 358/60, 50, 55, 64, 358/82, 3, 237–239, 250; 352/59–61, 66–68; 354/103; 315/370, 371, 386; 353/31–33, 30

[56] References Cited

U.S. PATENT DOCUMENTS 4,087,835  5/1978  Nishimura et al. .................... 358/60

Primary Examiner—John C. Martin
Attorney, Agent, or Firm—Lewis H. Eslinger; Alvin Sinderbrand

[57] ABSTRACT

A projecting apparatus, such as a color video projector, includes a screen, a plurality of image sources, such as cathode ray tubes, and a plurality of projecting lenses for projecting the images from the image sources onto the screen to form a compound image. The projecting lenses are arranged so that the principal axes thereof are parallel to one another and at least one of the lenses is arranged with the principal axis thereof epaxially displaced with respect to the central axis of a respective one of the plural image sources, so that the images projected through the lenses are caused to coincide on the screen. One or more light intercepting plates are interposed in the optical path between at least one of the image sources and the screen to intercept a portion of the light emitted by at least one of the image sources so as to compensate for unevenness of distribution of brightness in the projected images.

10 Claims, 23 Drawing Figures

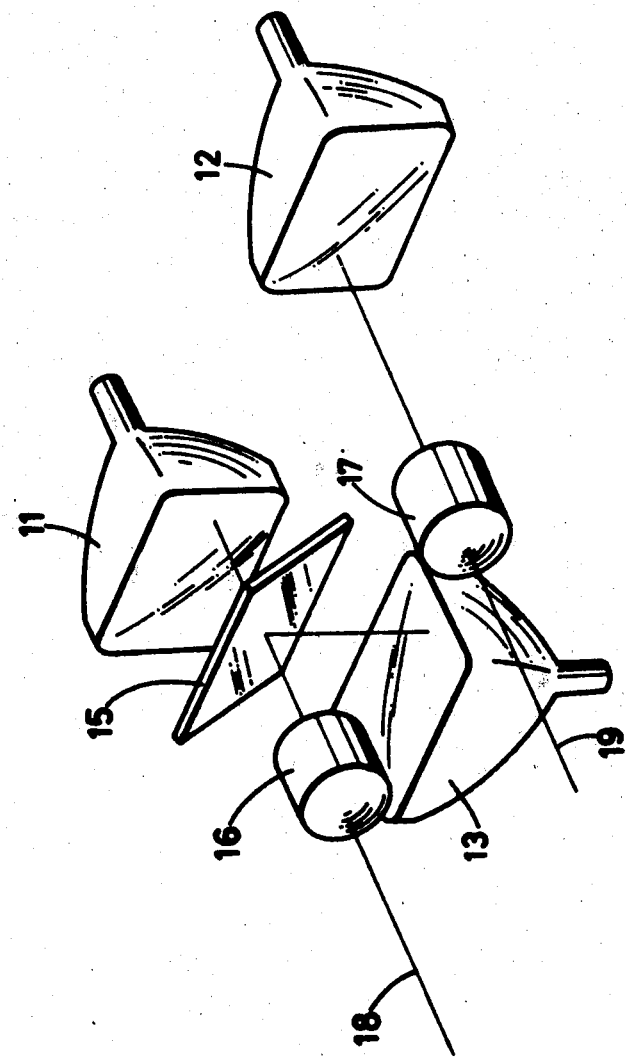

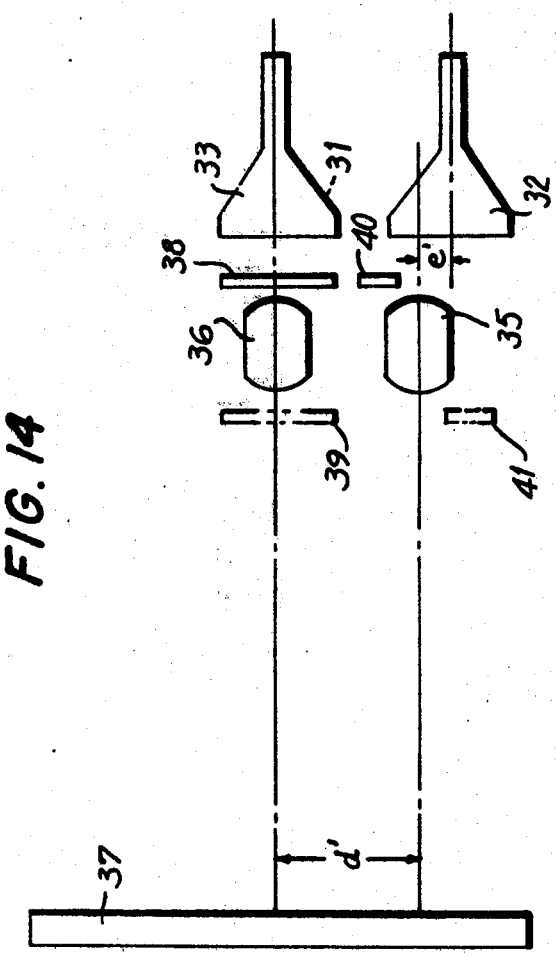

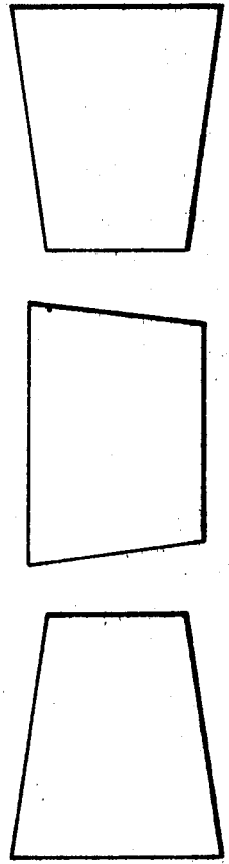
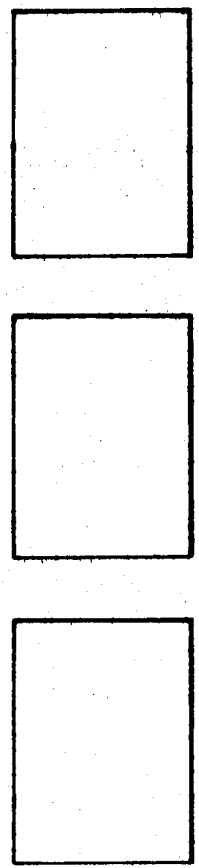

PROJECTING APPARATUS

REFERENCE TO RELATED APPLICATION

This application is a Continuation-In-Part application of copending Application, Ser. No. 903,002, filed May 4, 1978, now abandoned.

BACKGROUND OF THE INVENTION

1. Field of the Invention

This invention relates to a projecting apparatus wherein a plurality of video sources from respective video images which are projected through focusing means and presented as a compound image on a screen.

2. Description of the Prior Art

A typical color video projector is provided with three cathode ray tubes which form a red video image, a green video image and a blue video image. These three images are projected through respective focusing means such as lenses and are compounded and mixed on a screen.

Typically, the cathode ray tubes which form the green and red video images are inclined in a horizontal direction so that the central axes of the tubes intersect at the center of the screen and the cathode ray tube which forms the blue image is vertically oriented so that its image is facing in the vertical direction and is reflected, as by a semi-reflecting mirror, so as to be projected on the screen. In this manner, the three images are compounded and mixed on the screen. However, because of the described inclination or orientation of the cathode ray tubes and their respective lenses, the images projected on the screen are deformed, typically in the sense to distort a rectangular screen-shape into a trapezoidal form, with the red and blue trapezoid images being oriented in one direction and the green trapezoid image being oriented in the opposite direction. As a result, there occurs a misalignment of the respective color images on the screen.

In order to correct this deformation of the color images and consequent misalignment thereof, one known system uses conventional cathode ray tubes which are provided with expensive electronic correcting means which form reversely deformed video signal sources to cancel out the projected optical deformations. Another projection system arranges the projecting lenses so that the principal axes thereof are parallel to each other and symmetrically arranged about a normal to the screen and the central axes of the cathode ray tubes are epaxially displaced from the principal axes of the respective ones of the projecting lenses. However, such a system provides an uneven distribution of brightness of the different color images projected on the screen. As a result, it is necessary to use relatively complex and expensive circuitry to compensate for these variations in brightness.

OBJECTS AND SUMMARY OF THE INVENTION

Accordingly, it is an object of this invention to provide a projecting apparatus with an improved arrangement for compounding plural projected images on a screen from respective video sources without any preliminary correction.

Another object of this invention is to provide a projecting apparatus which compounds plural projected images on a screen from respective video sources in such a manner that the distribution of the brightness of each projected image is uniform across the width of the screen.

According to an aspect of this invention, in a projecting apparatus, such as a color video projector, which includes a screen, a plurality of image sources, such as cathode ray tubes, and a plurality of focusing means, such as, projecting lenses, for projecting the images from the image sources onto screen to form a compound image; the focusing means are arranged so that the principal axes thereof are parallel to one another and at least one of the focusing means is arranged with the principal axis thereof epaxially displaced with respect to the central axis of a respective one of the plural image sources to cause the images projected through the lenses to coincide on the screen. Intercepting means, for example, one or more intercepting plates, is interposed in the optical path between at least one of the image sources and the screen so as to compensate for unevenness in the distribution across the width of the screen in the brightness of the projected images.

In one arrangement according to the invention, several intercepting plates are used, and each is respectively arranged between one of the projecting lenses and the screen. Alternatively, the intercepting plates may be interposed between one or more of the image sources and the respective projecting lens or lenses.

In a particular color video projector according to the invention, first, second and third cathode ray tubes respectively form red, green, and blue video images, and the red image is transmitted through a half-reflecting mirror and through a first projecting lens, the green image is transmitted through a second projecting lens and the blue image is reflected by the half-reflecting mirror and then transmitted through the first projecting lens. In such a color vido projector, a single plate can be interposed in the paths between the cathode ray tubes and the screen in advance of the projecting lenses so as to intercept a portion of the light emitted from the first and third cathode ray tubes with one edge portion thereof, and to intercept a complementary portion of the light emitted from the second cathode ray tube with another edge portion thereof. Alternatively, the three cathode ray tubes may be arranged in a so-called delta configuration.

The above, and other objects, features and advantages of the invention, will be apparent in the following detailed description of illustrative embodiments thereof which is to be read in accordance with the accompanying drawings.

BRIEF DESCRIPTION OF THE DRAWINGS

FIG. 5 is a schematic perspective view of the color video projector of FIG. 4 showing the arrangement of the three cathode ray tubes and the lenses therefor;

FIG. 14 is a schematic side elevational view of the video projector show in FIG. 13;

FIGS. 15A, 15B and 15C are schematic diagrams showing the projected red, green and blue images, respectively, in a projector in which three lenses and their respective cathode ray tubes are arranged in a delta configuration, with the central axes thereof being inclined toward the center of the screen; and FIGS. 16A, 16B and 16C are schematic diagrams of the projected red, green and blue images, respectively, as obtained with the apparatus according to this invention as shown in FIGS. 13 and 14.

DETAILED DESCRIPTION OF THE PREFERRED EMBODIMENTS

Figure 1:
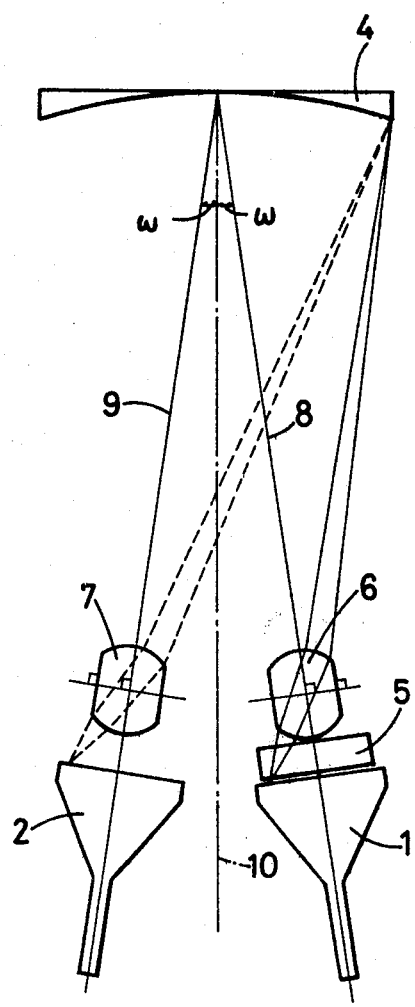
FIG. 1 is a schematic top plan view of a conventional color video projector.
Figure 2:
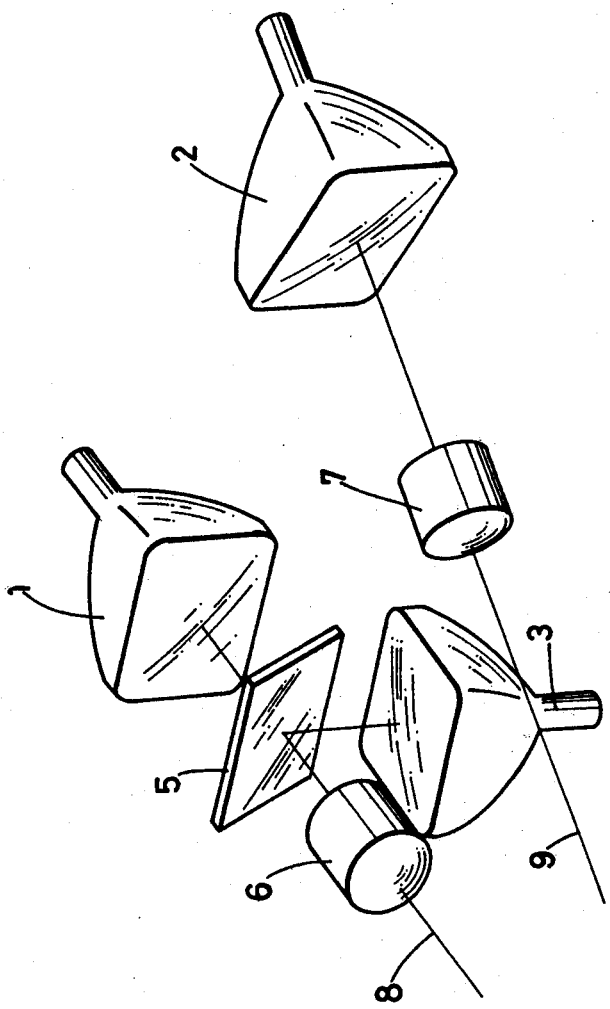
FIG. 2 is a schematic perspective view of the conventional projector of FIG. 1 showing the arrangement of the three cathode ray tubes and the lenses therefor.

As shown in FIG. 1 and FIG. 2, in a conventional color video projector, a cathode ray tube 1 for providing a red image and a cathode ray tube 2 for providing a green image are arranged with their screens and the images thereon facing toward a screen 4. In addition, a cathode ray tube 3 for providing a blue image is arranged with its axis extending vertically so that the screen of tube 3 and the blue image thereon face in the upward direction. The light beam of the red video image from the tube 1 is transmitted through a half-reflecting mirror 5 and is refracted by the lens 6. As a result, the image from the red video source is projected and focused on screen 4. The light beam of the green video image from the tube 2 is refracted by the lens 7 so that the green image is projected and focused on the screen 4. Further, the light beam of the blue video image from the tube 3 is reflected by half-reflecting mirror 5 and is refracted by lens 6, whereby the blue image from tube 3 is also projected and focused on the screen 4. Accordingly, the three projected images are compounded and mixed on the screen, and a color image is formed.

Figures 3A, 3B:
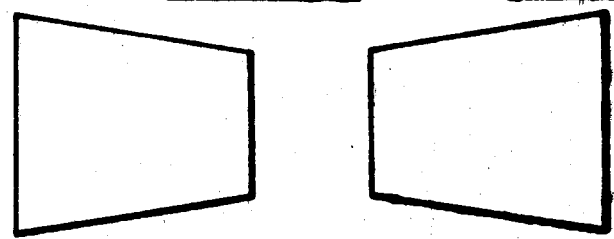
FIGS. 3A and 3B are schematic diagrams showing the deformed red image and green image, respectively, as projected on the screen by the apparatus of FIG. 1.

In the above known apparatus, the principal axis 8 of lens 6 and the principal axis 9 of lens 7 intersect with the line 10 normal to the screen 4 at the center of the latter, and are each at an angle "ω" with respect to line 10, as shown in FIG. 1. Further, the principal axis 8 of lens 6 and the principal axis 9 of lens 7 are symmetrical to each other relative to the line 10 normal to the screen 4. As a result, if the screen or face of tube 1 is assumed to be rectangular, the red image thereof on the screen 4 is deformed into the shape of a trapezoid or Keystone, as shown in FIG. 3A. On the other hand, the green image of the face of tube 2, as projected on the screen 4, is deformed into the shape of a trapezoid or Keystone, as shown in FIG. 3B, which does not coincide with the deformed red image of FIG. 3A. The blue image on the screen 4 is deformed as shown in FIG. 3A because the image from the blue video source is projected through the lens 6. The trapezoid shown in FIG. 3A and the trapezoid shown in FIG. 3B are symmetrical to each other relative to the vertical center line of screen 4.

When these projected images are compounded to form a composite image, the respective images do not coincide everywhere with each other, that is, the red image and the green image do not coincide with each other, and the blue image and the green image do not coincide, although the red image and the blue image are coincident with each other. Such non-coincidence is especially prevalent along the sides of composite images.

To rectify this problem, the conventional cathode ray tubes 1, 2 and 3 of the video projector are provided with correcting means which form reversely deformed video sources to cancel out the projected optical deformations. The resulting reversely deformed video images are projected on the screen 4 as previously described as to have no deformations on the screen, and a compounded color image is formed therefrom on the screen 4. However, if this technique is used, the cathode ray tubes become expansive because of the special lenses required for the correcting means, and it is difficult to form such inversely or reversely deformed images.

There will now be described color video projectors of types to which this invention can be applied.

Figure 4:
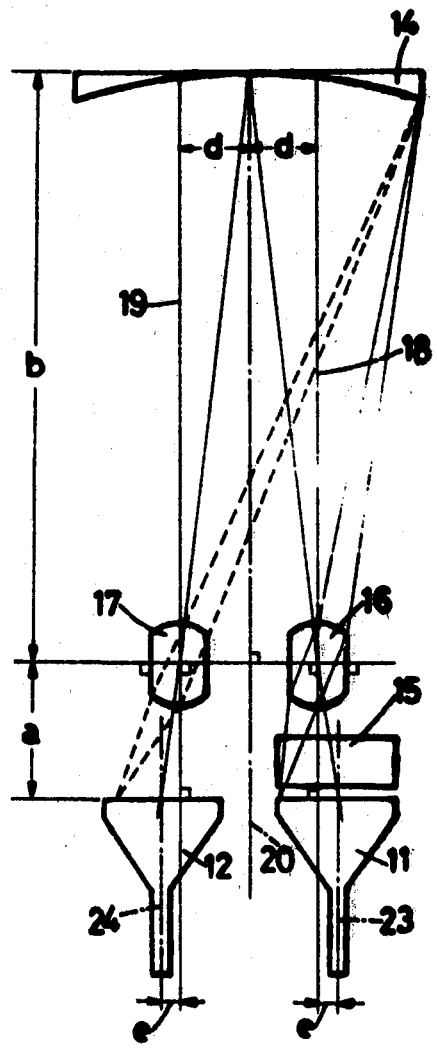
FIG. 4 is a schematic top plan view of a color video projector in which the principal axes of the lenses are parallel and normal to the screen and the central axes of the respective cathode ray tubes are displaces epaxially therefrom.

As shown on FIGS. 4 and 5, a cathode ray tube 11 which forms the red video image and a cathode ray tube 12 which forms the green video image are arranged in such a manner that the front faces or screens of tubes 11 and 12 face toward a screen 14 whereon the projected images are mixed or compounded to form a composite image. On the other hand, a cathode ray tube 13 which forms the blue video image is arranged with its axis extending vertically. The light beam emanating from the red image on tube 11 is transmitted through a half-reflecting mirror 15 and is refracted by a lens 16 so that the red image is projected on screen 14. The light beam emanating from the green image on tube 12 is reflected by a lens 17 and is projected thereby on screen 14. Further, the light beam emanating from the blue image on tube 13 is reflected by half-reflecting mirror 15 and is refracted by lens 16 so that the blue image is projected on screen 14. Accordingly, three projected images are mixed and compounded on screen 14 and a composite color image is formed thereon.

In the color video projector of FIGS. 4 and 5, the principal axis 18 of lens 16 and the principal axis 19 of lens 17 are parallel to a line 20 which is normal to screen 14 at the center of the latter. Furthermore, the principal axis 18 and the principal axis 19 are symmetrical to each other relative to the normal line 20, and the axes 18 and 19 are each displaced from the normal 20 by a predetermined distance "d".

Figures 6A, 6B:
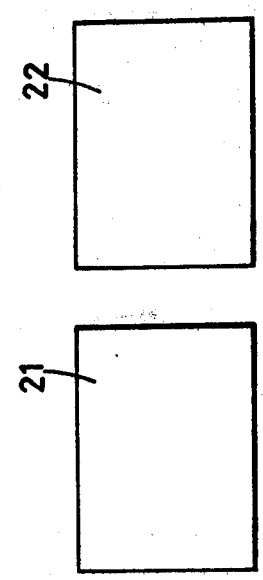
FIGS. 6A and 6B are schematic diagrams of the red image and the green image, respectively, as projected on the screen by the apparatus of FIG. 4.

By utilizing the above arrangement in the projector, trapezoidal deforming or keystoning of the projected images is avoided, at least in the vertical direction of screen 14, because the principal axes 18 and 19 of lenses 16 and 17 are parallel to the normal line 20. In other words, when lenses 16 and 17 are arranged with their principal axes 18 and 19 horizontal, the projected image 21 from the red video source and the projected image from the blue source are undeformed, that is, appear in the shape of a rectangle, as shown on FIG. 6A, and the projected image 22 from the green video source also appears in the shape of a rectangle, as shown on FIG. 6B. In this manner, respective color images coincide with each other in the vertical direction on screen 14, when the projected images are compounded and mixed thereon, to form a mixed color image, and color shifting in the mixed color image is avoided in the vertical direction on screen 14.

Figure 7:
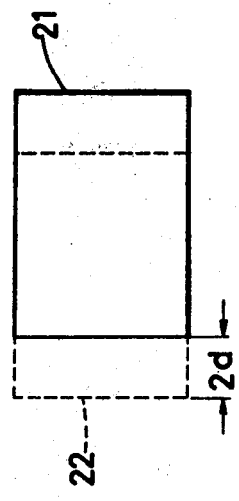
FIG. 7 is a schematic diagram of the coumpounded image provided by the apparatus of FIG. 4 when the central axes of the cathode ray tubes are not epaxially displaced from the principal axes of the respective lenses.

However, the projected red image 21 and the projected green image 22 do not coincide with each other and are out of alignment by the distance "2d", in the horizontal direction on the screen, as shown in FIG. 7. In other words, a horizontal shift occurs between the red image 21 and the green image 22 on screen 14 because the principal axis 18 of the lens 16 is separated from the principal axis 19 of the lens 17, by the distance "2d". The blue projected image, however, is coincident with the red projected image 21 on the screen.

To rectify the above-mentioned horizontal shift, in the apparatus of FIG. 4, the axes of cathode ray tubes 11, 12 and 13 are epaxially displaced from the axes of the respective lenses 16 and 17, that is, the central axes 23 and 24 of the cathode ray tubes 11 and 12 are parallel with, and displaced by the distance "c" to the outside of the principal axes 18 and 19 of lenses 16 and 17, respectively, as shown on FIG. 4. The central axis of cathode ray tube 13 is also displaced to the outside of the principal axis 18 of the lens 16, in the horizontal direction, by the distance "e", whereby the central light beam from the blue image provided by cathode ray tube 13 coincides with the central light beam from the red image when the blue light beam is reflected by the half-reflecting mirror 15.

As described above, in the apparatus of FIG. 4, any vertical shift between the plural projected images is rectified by the displaced and parallel arrangement of the principal axes of the lenses 16 and 17 relative to the normal line 20, and any horizontal shift between the plural projected images is rectified by the displaced arrangement of the cathode ray tubes 11 and 13 and the cathode ray tube 12 relative to the principal axes of the lenses 16 and 17, respectively. In this manner, the red, green and blue images are mixed and compounded on the screen 14 without any deformation or shifting of colors in the vertical and horizontal directions.

The light beams emitted from the centers of the faces of the cathode ray tubes 11, 12 and 13 must be focussed at the center of screen 14 by lenses 16 and 17. More particularly, the light beams which are emitted from the centers of the faces of tubes 11, 12 and 13 and which pass through the centers of lenses 16 and 17 must land at the center of screen 14 without being refracted by lenses 16 and 17. Therefore, the relation between "d" and "e" has to satisfy the following equation:

$$\frac{e}{d} = \frac{a}{b} \quad (1)$$

in which "a" is the distance from the front faces of cathode ray tubes 11, 12 and 13 to the centers of lenses 16 and 17, and "b" is the distance from the centers of lenses 16 and 17 to the surface of screen 14, as shown in FIG. 4. Further, as is well known, the relation between "a" and "b" is given by the following equation:

$$\frac{1}{a} + \frac{1}{b} = \frac{1}{f} \quad (2)$$

in which "f" is the focal length of lenses 16 and 17. Accordingly, the relation between "d" and "e" can also be written as follows:

$$\frac{e}{d} = \frac{f}{b-f} \quad (3)$$

or $$\frac{e}{d} = \frac{a-f}{f} \quad (4)$$

Figure 8:
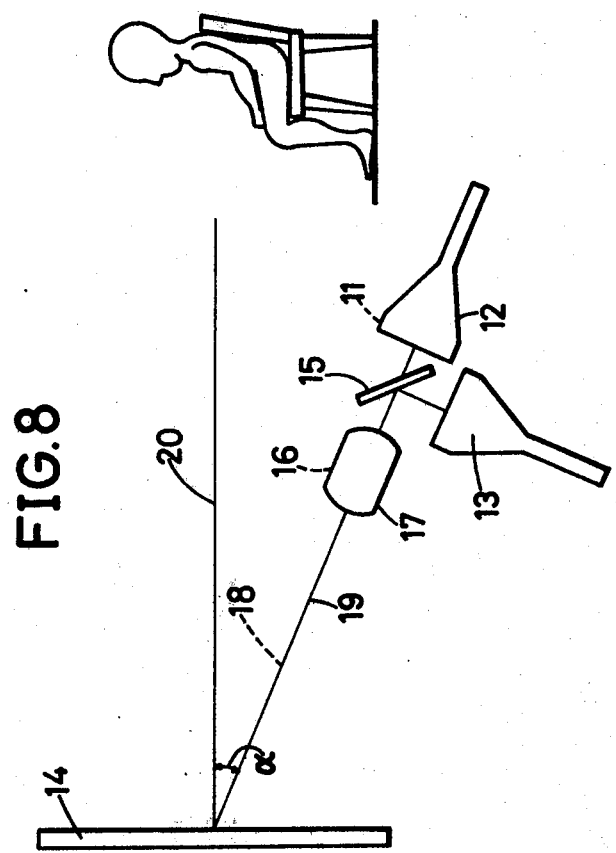
FIG. 8 is a schematic side elevational view of a modified color video projector, wherein the video sources are arranged in front of the screen, but below a line which is normal to the screen and passes through the center thereof.
Figure 9A:
FIGS. 9A and 9B are schematic diagrams of the red image and the green image, as projected on the screen by the projector shown in FIG. 8.
Figure 9B:
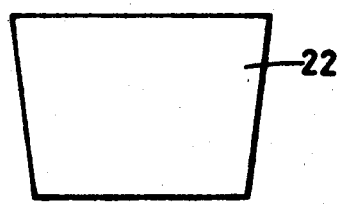

In the above description, the apparatus has been assumed to have the principal axes 18 and 19 of its lenses 16 and 17 parallel to the line 20 which is normal to the screen 14 both in the vertical direction and in the horizontal direction. However, the invention may also be applied to an apparatus in which the principal axes 18 and 19 of lenses 16 and 17 are parallel to the normal line 20 of the screen 14 only in the vertical direction or only in the horizontal direction. For example, as shown in FIG. 8, the lenses 16 and 17 may be arranged with the principal axes 18 and 19 thereof in a plane that intersects with the normal line 20 of the screen 14 by an angle "α" in the vertical direction, as viewed from the side of the apparatus. In the case of the apparatus shown on FIG. 8, the projected red image 21 and the projected green image 22 are not rectangular, but are trapezoidal, as shown on FIG. 9A and FIG. 9B, respectively, which show deformations of the images in the horizontal direction. Since these two trapezoidal images are congruent with each other, no color slipping occurs when these trapezoidal or Keystoned images are compounded on a screen Therefore, it is not necessary to correct the images before projection when the angle "α", between the plane of principal axes 18 and 19 and the normal line 20, is small. However, if desired the cathode ray tubes 11, 12 and 13 may be provided with correcting means to preliminarily correct the images taking into account the optical deformations that arise in projecting such images onto the screen 14, whereby rectangular compounded images are displayed on the screen.

As previously described, in the projection of FIG. 4, vertical optical deformation of the compounded images is rectified or avoided by arranging lenses 16 and 17 in such a manner that the principal axes 18 and 19 thereof are parallel to and displaced from the line 20 normal to the center of screen 14. Further, the horizontal shift between plural images is rectified or avoided by arranging cathode ray tubes 11, 12 and 13 in such a manner that the central axes of the tubes are epaxially displaced from the principal axes 18 and 19 of lenses 16 and 17. With such arrangement, the distributions of the brightness of the plural images across the width of the scrren 14 are asymmetrical relative to the center of the screen 14, because the principal axes 18 and 19 are deflected from the line 20 normal to the center of the screen 14.

Figure 10:
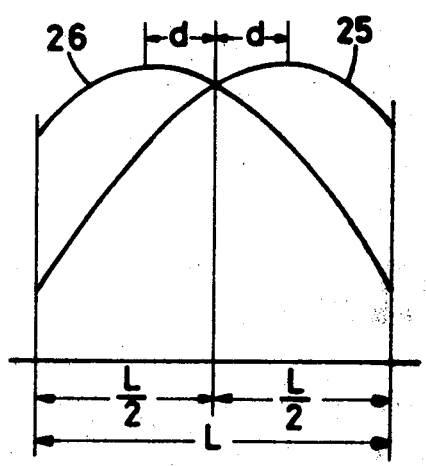
FIG. 10 is a graph which shows the distributions of brightness in the red image and the green image across the width of the screen when projected by the apparatus of FIG. 4 and FIG. 8.

As shown on FIG. 10, the distribution of the brightness of the red image of the blue image, as projected by the lens 16 on screen 14, is indicated by curve 25, and the distribution of the brightness of the green image, as projected by lens 17 on screen 14, is indicated by a curve 26. In FIG. 10, "L" represents the width of screen 14. Therefore, the red color and the blue color are emphasized on the right-hand side of screen 14, and the green color is emphasized on the left-hand side of the screen. Accordingly, the color tone varies across the width of the screen 14, and it is difficult to obtain uniformity in the color tone over the entire screen.

In accordance with the present invention, the foregoing problems are overcome generally by providing intercepting means interposed between the cathode ray tubes or image sources and the screen so as to intercept a portion of the light emitted by at least one of the image sources and thereby compensate for uneven distribution of brightness in the projected images.

Figure 11:
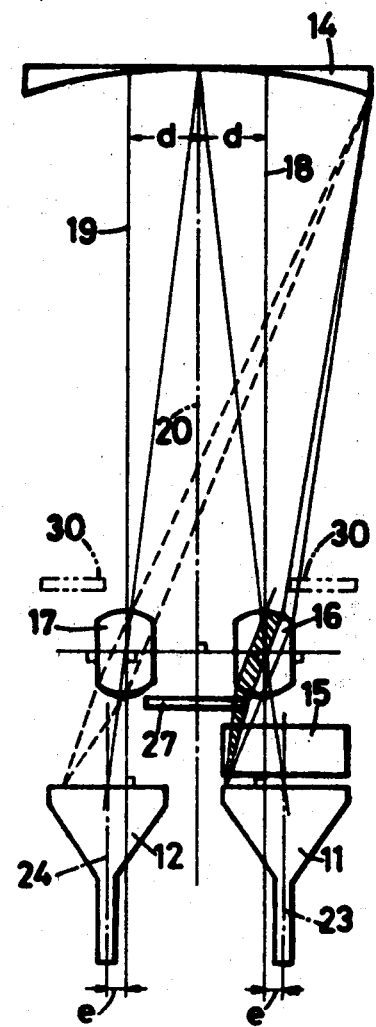
FIG. 11 is a schematic top plan view of one embodiment of a video projector in accordance with this invention.
Figure 12:
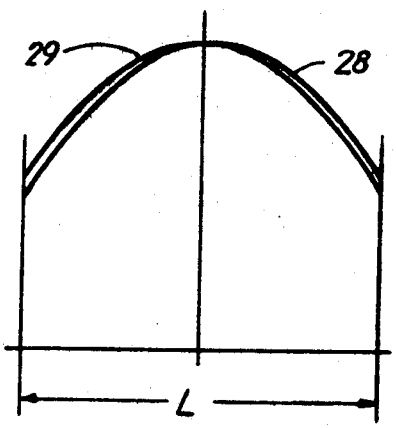
FIG. 12 is a graph which shows the distribution of brightness across the width of the screen in the red and green images projected by the apparatus of FIG. 11.

More particularly, in an embodiment of the invention which is otherwise the same as the projector of FIG. 4, an intercepting plate 27 is provided in advance of lenses 16 and 17, as shown in FIG. 11. The plate 27 intercepts portions of the light beams from the red video source and the blue video source with the right-hand portion of plate 27, and also intercepts a portion of the light beams from the green video source with the left-hand portion of plate 27. By reason of this arrangement, the distributions of the brightness of the red image and the blue image along the with of the screen 14 are made to be almost symmetrical relative to the center of the screen 14, as shown by curve 28 on FIG. 12. Further, the distribution of the brightness of the green image across the width of screen 14 is also made to be almost symmetrical relative to the center of screen 14, as shown by curve 29 on FIG. 12. In this manner, a uniform color tone is obtained across the entire screen 14 when the red, green and blue images are compounded on the screen by the apparatus in FIG. 11.

Alternatively, as indicated in dot-dash lines on FIG. 11, a pair of intercepting plates 30 may be arranged between lenses 16 and 17 and the screen 14 to intercept the light beams. In this modification, the intercepting plate 30 at the right-hand side of FIG. 11 intercepts a portion of the red light beam and a portion of the blue light beam, and the intercepting plate 30 at the left-hand side of the drawing intercepts a portion of the green light beam.

The intercepting plates 27 or 30 provided in accordance with this invention are desirably of a flat, rectangular configuration and of an opaque material. For example, flat metal plates may be utilized which are coated with a black paint so as to intercept portions of the respective color light beams.

Another embodiment of this invention will now be described with reference to FIGS. 13 and 14, in which the red, green and blue images formed on the front faces of cathode ray tubes 31, 32 and 33, respectively, are projected on a screen 37 through respective lenses 34, 35 and 36. The cathode ray tubes 31, 32 and 33 are arranged in a delta configuration such that they are respectively at three vertices of an isosceles triangle, for example, with the cathode ray tubes 31 and 33 being respectively displaced from tube 32 to the right and to the left, when viewed from above as on FIG. 13 and with the cathode ray tube 32 displaced downwardly from the tubes 31 and 33, when viewed from the side, as on FIG. 14. In this manner, the central axis of the cathode ray tube 32 is on the same vertical plane with the normal which passes through the center of the screen 37, and the central axes of the cathode ray tubes 31 and 33 are on the same horizontal plane with the central normal of the screen 37.

Figure 13:
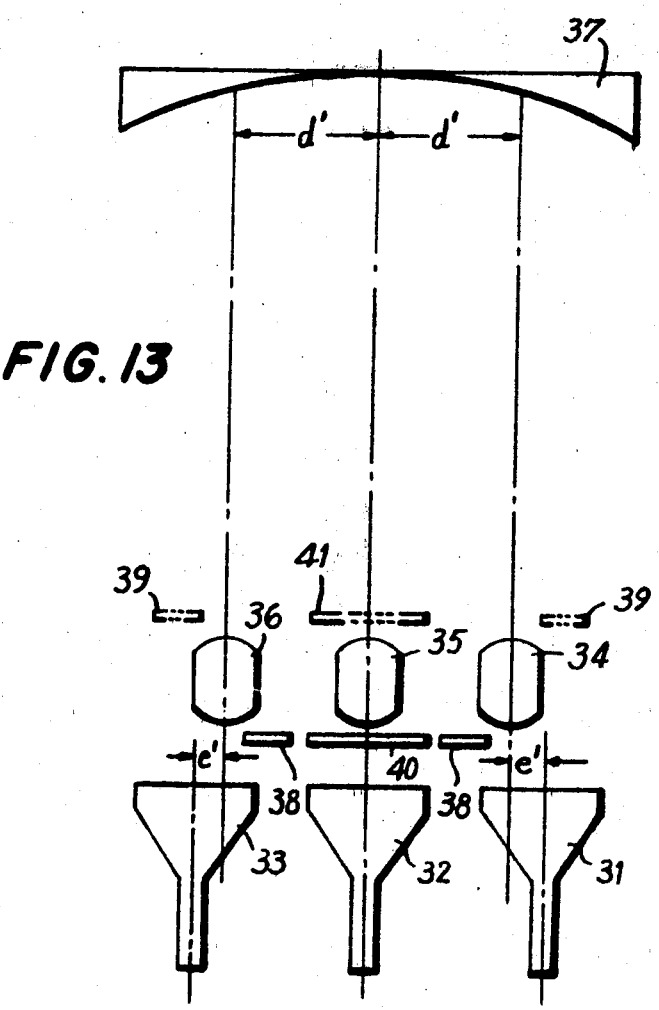
FIG. 13 is a schematic top plan view of a video projector according to a second embodiment of this invention, and in which the cathode ray tubes are arranged in a delta configuration.

In the projector of FIGS. 13 and 14, if lenses 34, 35 and 36 and cathode ray tubes 31, 32 and 33 were arranged so that the principal axes of lenses 34, 35 and 36 and the central axes of cathode ray tubes 31, 32 and 33 passed through the center of screen 37, in the same manner as a conventional video projector originally rectangular red, green and blue images would form the shapes shown on FIGS. 15A, 15B and 15C, respectively, when projected onto screen 37. Thus, if the three images shown on FIGS. 15A, 15B and 15C were compounded on screen 37, color shifting would occur both in the vertical and horizontal directions.

In order to avoid the above problem, in the horizontal direction, lenses 34 and 36 are arranged in such a manner that the principal axes thereof are parallel to a line normal to screen 37 at the center of the latter, and are displaced from such normal line by the distance d'. Further, cathode ray tubes 31 and 33 are arranged in such a manner that their central axes are epaxially displaced from the respective principal axes of lenses 34 and 36 by the distance e' as shown in FIG. 13. In the vertical direction, the lens 35 is arranged with its principal axis parallel to the line normal to screen 37 at the center, and is displaced downward from such normal line by the distance d". Further, the cathode ray tube 32 is arranged with its central axis epaxially displaced from the principal axis of lens 35 by the distance e', as shown on FIG. 14.

Accordingly, the red, green and blue images projected on screen 37 are all rectangular and are congruent with each other, as shown in FIGS. 16A, 16B and 16C. The compound image formed from the three images on the screen is free of color shifting both in the vertical and horizontal directions on the screen. Further, the three images are compounded with complete coincidence.

However, as discussed previously in regard to FIG. 11, there occurs an asymmetrical distribution of the brightness on the screen of the projected red and blue images and the projected green image.

In accordance with this invention, to avoid such uneven distribution with the delta arrangement of the cathode ray tubes shown on FIGS. 13 and 14, intercepting plates 38 and 40 may be disposed between cathode ray tubes 31, 32, and 33 and the respective lenses 34, 35 and 36 so as to intercept portions of the light beams emanating from the cathode ray tubes. More particularly, as shown, two plates 38 which are rectangular and vertically elongated may be arranged adjacent the portions of the faces of tubes 31 and 33 which are nearest each other, with the right-hand intercepting plate 38 used to intercept a portion of the light beam from the red cathode ray tube 31 with the right-hand side thereof and the left-hand intercepting plate 38 used to intercept a portion of the light beam from the blue cathode ray tube 33 with the left-hand side thereof. The remaining intercepting plate 40 may be laterally centered and elongated to intercept a portion of the light beam from the green cathode ray tube 32 with a bottom section thereof, as shown on FIG. 14.

Alternatively, as indicated by dot-dash lines on FIGS. 13 and 14, intercepting plates 39 and 41 may be arranged between lenses 34, 35 and 36 and screen 37 to intercept the light beams. More particularly, the right-hand intercepting plate 39 may be disposed to intercept a portion of the light beam emanating from lens 36 with the right side thereof, and the central intercepting plate 41 may be disposed to intercept a portion of the light beam emanating from lens 35 with a top section thereof.

Once again, the intercepting plates 38 and 40 or 39 and 41 on FIGS. 13 and 14 may be opaque, for example, of black painted sheet metal.

Having described specific embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A projecting apparatus for projecting a compound image onto a screen; comprising a plurality of image sources each providing a respective plane image with each of the image sources having a central axis normal to the plane of the image thereof; plural focusing means for projecting said images in respective optical paths onto said screen to form said compound image, said focusing means having respective principal axes which are arranged substantially parallel to one another, at least one of said focusing means being arranged with the principal axis thereof epaxially displaced with respect to the central axis of a respective one of said plurality of image sources so that the projected images are made to coincide with each other on said screen; and intercepting means interposed in at least one of said optical paths between said image sources and said screen to intercept a portion of the light emitted by at least one of said image sources so as to compensate for unevenness of distribution of brightness in the projected images.

2. A projecting apparatus according to claim 1; wherein each of said intercepting plates is of a substantially flat rectangular configuration, and is opaque.

3. A projecting apparatus according to claim 1; wherein said intercepting means includes plural intercepting plates, each arranged between a respective one of said focusing means and said screen, to intercept a portion of the light transmitted through said respective focusing means.

4. A projecting apparatus according to claim 1; wherein said intercepting means includes an intercepting plate interposed between at least one of said image sources and a respective one of said focusing means.

5. A projecting apparatus according to claim 1; wherein said plurality of image sources includes a plurality of cathode ray tubes forming respective color images of respective different primary colors, and said plurality of focusing means includes a plurality of projecting lenses for focusing respective color images on said screen whereon the color images are mixed and compounded.

6. A projecting apparatus according to claim 5; further comprising a half-reflecting mirror; and wherein said plurality of image sources includes first, second and third cathode ray tubes forming red, green and blue color images, respectively, and said plurality of projecting lenses includes two lenses, the image of the first cathode ray being transmitted through said half-reflecting mirror and through a first one of said lenses, the image of said second cathode ray tube being transmitted through a second one of said lenses, and the image of said third cathode ray tube being reflected by said half-reflecting mirror and transmitted through said first lens.

7. A projecting apparatus according to claim 6; wherein said principal axes of the first and second lenses are contained in a plane which is inclined, in the vertical direction, with respect to a line normal to the screen and passing through the center thereof, so as to intersect such line on the screen at a predetermined angle.

8. A projecting apparatus according to claim 6; wherein said intercepting means includes an intercepting plate disposed in the path between said cathode ray tubes and said projecting lenses so as to intercept a portion of the light emitted from said cathode ray tubes.

9. A projecting apparatus according to claim 5; wherein said plurality of image sources includes first, second and third cathode ray tubes forming red, green and blue color images respectively, and arranged in a delta configuration, and said plurality of projecting lenses includes three lenses, respectively corresponding to said cathode ray tubes.

10. A projecting apparatus according to claim 9; wherein said intercepting means includes three intercepting plates, each plate being interposed between a respective cathode ray tube and its respective projecting lens for intercepting a portion of the light emanating from said respective cathode ray tube.

* * * * *